United States Patent [19]

Bartholomew

[11] Patent Number: 4,610,284

[45] Date of Patent: Sep. 9, 1986

[54] AUTOMOTIVE FUEL FILLER SYSTEM

[75] Inventor: Donald D. Bartholomew, Marine City, Mich.

[73] Assignee: Proprietary Technology, Southfield, Mich.

[21] Appl. No.: 668,763

[22] Filed: Nov. 6, 1984

[51] Int. Cl.[4] ............................................. B65B 3/04
[52] U.S. Cl. .................................. 141/302; 137/588; 285/2; 285/80; 285/53; 285/901; 285/921
[58] Field of Search ................. 137/588; 141/85–310, 141/392; 285/2, DIG. 22, DIG. 2, 80, 53

[56] References Cited

U.S. PATENT DOCUMENTS

| | | | |
|---|---|---|---|
| 117,857 | 8/1871 | Bonsalls et al. | 137/588 |
| 3,502,047 | 3/1970 | Crossbie | 137/588 |
| 3,805,829 | 4/1974 | Yamamoto et al. | 220/85 VR |
| 3,903,942 | 9/1975 | Vest | 141/301 |
| 3,979,010 | 9/1976 | Fiedler et al. | 220/86 R |
| 4,060,108 | 11/1977 | Weston et al. | 141/311 R |
| 4,122,968 | 10/1978 | Germain | 220/86 R |
| 4,142,647 | 3/1979 | Walters | 220/86 R |
| 4,252,245 | 2/1981 | Kudo | 220/85 F |
| 4,274,549 | 6/1981 | Germain | 141/285 |

*Primary Examiner*—Houston S. Bell, Jr.
*Attorney, Agent, or Firm*—Harness, Dickey & Pierce

[57] ABSTRACT

The fuel filling system includes double pipe fuel delivery and tank venting plumbing. Both fuel delivery pipe and tank venting pipe are flexible and communicate with the gas tank through normally closed check valves. An inlet housing defines a vent cut-off chamber which communicates with the tank venting pipe, and also includes an annular nozzle embracing seal for isolating the end of the gas pump nozzle from the vent cut-off chamber. The gas tank is thus fully sealed by the check valves during driving, so that fuel will not spill from the tank should the filling system plumbing become ruptured or should the vehicle become overturned as a result of a collision. Fuel is introduced into the tank under positive pressure provided by the filling station fuel pump. Under pumping pressure, the check valves open to permit the inflow of fuel and the outflow of air displaced from within the tank.

16 Claims, 3 Drawing Figures

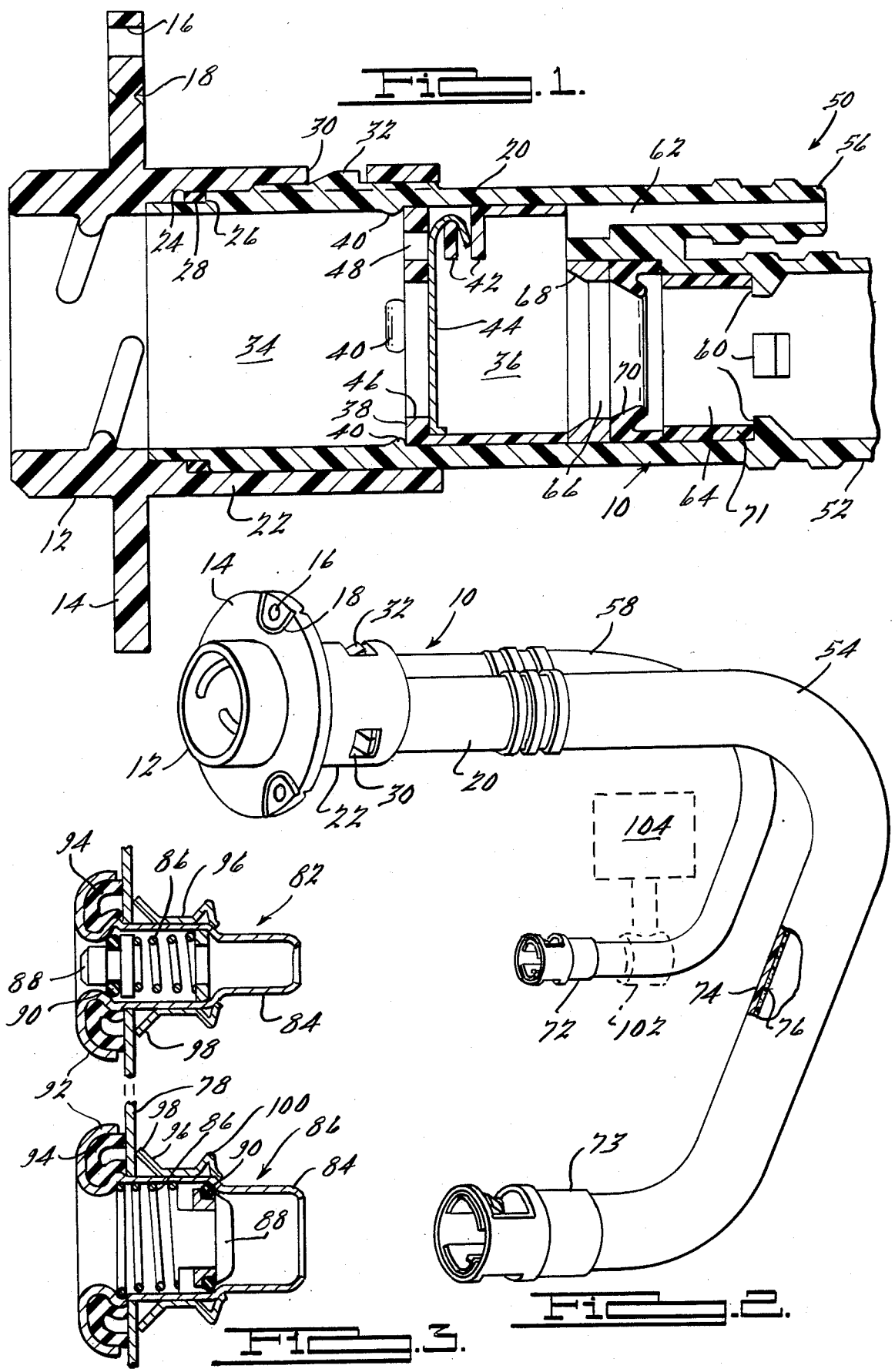

AUTOMOTIVE FUEL FILLER SYSTEM

BACKGROUND AND SUMMARY OF THE INVENTION

The present invention relates generally to filling pipe systems for introducing fuel into the fuel tank of an automotive vehicle. More particularly, the invention relates to an improved automotive fuel filling pipe system which is easily installed, lightweight and collision safe, and which provides automatic venting of overpressures within the fuel tank, while preventing the leakage of fuel and fuel vapors during normal operation and filling.

There have been numerous designs for fuel tank filler systems for automotive vehicles. With the advent of pollution control through vapor recovery systems and unleaded fuels, fuel filler pipes have become increasingly complex. This complexity arises from a number of design requirements. The fuel filling system must prevent leakage of fuel and vapor from the system in normal operation. It must allow for the entry of air to replace the fuel within the tank as it is consumed during use, and must also allow for the venting of overpressures within the tank, which can be caused by temperature changes, for example. The fuel filling pipe system must also provide a means for operating the automatic shut-off mechanism found on filling station fuel dispensing nozzles. In many jurisdictions, vapor recovery systems are required to prevent air pollution. In addition, the fuel filling pipe system must be capable of grounding out any static electric charge that may build up, and must also function over a wide range of ambient temperatures, both within the fuel tank system and external thereto. Finally, today's fuel filling pipe system must be constructed to prevent the introduction of leaded fuels into the fuel tank of a vehicle which cannot accept leaded fuels.

While there have been various systems in the prior art for providing one or more of the above system requirements, there is still much room for improvement, particularly with respect to saving weight and space, simplifying installation, crash worthiness and reducing costs (both cost of materials and installation labor). There is also additional room for improvement of operation during filling. More specifically, there is a problem with many present day fuel filling pipe systems which prevents the fuel tank from being filled at the maximum possible pumping rate, due to false triggering of the automatic shut-off mechanism. This problem is caused in part by fuel splash back and by the intercoupling of the vent mechanism with the fuel inlet passage. Also, while crash worthiness has been generally addressed within the industry, most so-called crash worthy fuel filling pipe systems simply employ breakaway filler neck tubes, permitting the filler tube to be severed from the gas tank upon impact. However, such breakaway designs do not adequately prevent fuel from leaking from the broken filler tube or gas tank after such a collision has occurred.

Accordingly, it is an object of the present invention to meet all of the above named fuel filling pipe design requirements, while overcoming the above problems found in the prior art. It is therefore an object of the invention to provide a more desirable and collision safe fuel filling pipe system which has a reduced size and weight, and simplified means for attachment between the automotive vehicle body and the gas tank. Yet another object of the invention is to provide a fuel filling pipe system which employs check valves at the gas tank to prevent leakage from the tank if the filling pipe system is ruptured, as during a collision.

A still further object of the invention is to provide a lower cost fuel filling pipe system which employs inexpensively manufactured and easily installed snap together plastic parts and flexible fuel piping. Through the use of such flexible piping and snap together components, the invention thus allows for better utilization of space within the automotive vehicle, making the invention ideal for use in smaller sized automobiles. The invention allows increased latitude in the location and routing of the fuel filling piping, which can result in lower overall costs and improved use of space for other automotive functional requirements.

Yet another object of the invention is to provide a more reliable fuel filling pipe system in which the venting system is isolated from the fuel filling pipe, so that fuel will not splash back and thereby block the venting system. This allows the automatic shut-off of the filling station nozzle to work with greater accuracy, thereby making it easier to precisely control the fill level in the tank. This results in the ability to utilize a smaller gas tank for the same fuel volume, by reducing the non-filled space within the tank.

In accordance with the invention a fuel filling pipe system is provided which employs a seal positioned to permit the filling of the fuel tank under pressure of the filling station fuel pump, while providing a positive seal so that fuel dispensed from the nozzle cannot enter the vent chamber. Also in accordance with the invention, the fuel tank is provided with a plurality of check valves, one associated with the fuel filling pipe, and the other associated with the venting system. These valves are normally held closed, so that fuel cannot leak from the tank even when the filling pipe has been broken or ruptured. The check valves are constructed to yield to the filling station fuel pump pressures, thereby permitting the introduction of fuel into the tank and the escape of air and vapors displaced by the incoming fuel.

These and other objects and advantages of the invention will become more apparent from a review of the following specification and the accompanying drawings.

BRIEF DESCRIPTION OF THE DRAWINGS

FIG. 1 is a cross-sectional view of the fuel filling pipe system of the invention with fuel and vent hoses and their associated fittings omitted;

FIG. 2 is a perspective view of the fuel filling pipe system of the invention, including the fuel and vent hoses and their associated fittings; and FIG. 3 is a cross-sectional view of a portion of a gas tank wall, showing the check valves in accordance with the invention.

DESCRIPTION OF THE PREFERRED EMBODIMENT

Referring now to FIG. 1, the fuel filling pipe system inlet housing is shown generally at 10. Housing 10 includes a threaded fuel cap receiving portion 12 which has an annular mounting flange 14 used to secure the inlet housing to the vehicle. The annular flange is preferably provided with a plurality of mounting holes for receiving the appropriate fasteners for securing the housing to the vehicle. Surrounding mounting holes 16, the flange is formed with reduced strength sections 18 which are designed to break away during a crash, thereby permitting the inlet housing to be severed from the automotive vehicle. FIG. 2 also illustrates these reduced strength sections on mounting flange 14. While three equally spaced reduced strength sections and three equally spaced mounting holes 16 have been illustrated, it will be understood that a different number and arrangement of mounting holes and reduced strength sections may be utilized without departing from the spirit of the invention.

Inlet housing 10 also includes an intermediate housing portion 20 which is slidably received within the annular hub portion 22 of cap receiving portion 12. Hub portion 22 is formed with an internally stepped diameter 24. and intermediate housing 20 is formed with a corresponding externally stepped diameter 26 which carries a rubber or plastic O-ring seal 28. The O-ring seal 28 deforms between the annular hub portion 22 and the intermediate housing portion 20 when the intermediate housing portion is inserted into the hub portion. The O-ring seal thus prevents fuel within the interior of the intermediate housing portion from leaking to the outside. Hub portion 22 is also provided with a plurality of windows 30 which receive retaining lugs 32 formed about the outer periphery of the intermediate housing portion 20. Lugs 32 have ramped leading edges and stepped trailing edges so that the lugs snap into windows 30 in a simple snap together assembly procedure. Once snapped together, the stepped trailing edges of lugs 32 prevent the intermediate housing portion from being pulled out from within hub portion 22.

Intermediate housing portion defines an outer vent chamber 34 and a vent cut-off chamber 36. Between the outer vent chamber and the vent cut-off chamber, a splash door mounting component 38 is disposed. The splash door mounting component is slidably and internally received within intermediate housing portion 20, and housing portion 20 includes a plurality of raised lugs 40 which confront and retain splash door mounting component 38. The splash door mounting component includes a pair of spaced apart flanges 42 which carry one end of a spring steel splash door 44. The opposite end of splash door 44 is unsupported and is free to deflect out of the way when the gas pump nozzle is inserted. Splash door mounting component 38 defines a first aperture 46 which is sized to receive a gas pump filling nozzle. For automotive vehicles which require unleaded fuels, the aperture 46 should be of sufficiently small diameter to prevent insertion of the comparatively larger nozzle used to dispense leaded fuels. Thus a leaded fuel nozzle will be unable to enter aperture 46 to deflect splash door 44. With splash door 44 remaining in the normally closed position, it completely blocks aperture 46, thus preventing the introduction of leaded fuels into the gas tank. Splash door mounting component also defines a second aperture 48, which serves as an air bleed port.

The intermediate housing portion 20 has a distal end configuration (shown generally at 50) which includes a male barbed nipple portion 52 for connection to the fuel hose 54, and a second male barbed nipple portion 56 for connection the vent hose 58. Hoses 54 and 58 are depicted in FIG. 2. The nipple portions 52 and 56 preferably have a plurality of longitudinally arranged, annular barbs for force fit retention of the fuel hose 54 and vent house 58. Within the interior of the fuel hose nipple 52 a plurality of nozzle depth stops 60 are arranged. These depth stops are arranged generally as shown in FIG. 1 and serve to check or stop the inserted end of the gas pump nozzle at the proper position for filling, and also prevents over insertion of the nozzle to the point where the nozzle handle might scratch the vehicle's paint job.

Vent nipple 56 defines a vent passageway which communicates with vent cut-off chamber 36, and similarly, fuel hose nipple 52 defines a fuel passageway 64 which likewise communicates with vent cut-off chamber 36 via an intermediate fuel passageway 66. The intermediate fuel passageway is defined in part by a nozzle guide member 68 which has inwardly tapered sidewalls to direct and center the nozzle, when inserted within the intermediate passageway. The intermediate passageway further includes a nozzle end seal 70 disposed adjacent the nozzle guide member and is spaced from the stops 60 by an annular bushing element 71. The nozzle end seal has an annular protuberance which is inclined or swept backwardly toward the nipple 52. Nozzle end seal 70 is preferably of an elastomeric material and is adapted for tightly gripping the end of the gas pump nozzle, to isolate the open end of the nozzle from the vent cut-off chamber. Such isolation provides an important advantage of permitting the fuel to be dispensed at high flow rates without the risk of the vent passageway 62 becoming blocked by the backflow of fuel. This also insures that the automatic cut-off mechanism of the gas pump filling nozzle will not be erroneously triggered. Further, seal 70 insures that fuel pumping pressures do not leak into chamber 36, but rather act with full force to operate the fuel tank check valve mechanisms, yet to be discussed.

Referring now to FIG. 2, vent hose 58 and fuel hose 54 are shown in their attached positions. Both hoses are provided with snap fitting connectors 72 and 73, used to connect the hoses to the fuel tank, yet to be discussed. In order to prevent the build-up of static electricity which can result from the rapid in-rush of essentially non-conductive fuel through fuel hose 54, the fuel hose is fabricated to include an electrically conductive, or at least partially conductive (between $10^{-5}$ to $10^{-4}$ ohms/cm$^2$). This may be accomplished by forming a coextrusion of an outer hose layer 74 and an inner layer 76. The inner layer 76 must be fabricated from a very thin layer of plastic that has been coated with or imbedded with a graphite material or another conductive material. In the alternative, hose 54 may be a single wall extrusion with an internal coating of a conductive material. Connectors 72 and 73 may be fabricated of metal or plastic. If desired, the ends of hoses 54 and 58 may be expanded to make a friction fit sealing connection with the quick connector fittings on the gas tank wall, yet to be discussed. A suitable connector and quick connector fitting is disclosed in U.S. patent application Ser. No. 360,201, filed Mar. 22, 1982 and entitled "A Swivelable Quick Connector Assembly", which application is a continuation-in-part of U.S. patent application Ser. No. 201,711, filed Oct. 29, 1980.

Referring now to FIG. 3, the gas tank wall is shown in cross-section at 78. Gas tank wall 78 is provided with a fuel hose fitting 80 and a vent hose fitting 82 for receiving connectors 73 and 72, respectively. Both fittings incorporate check valves which are biased to normally seal both the vent passage and the fuel passage. The check valve of the fuel hose fitting 80, when acted upon by incoming fuel pressures, moves against the spring bias force to a position which permits fuel to enter the tank. The check valve of the vent house fitting operates in the opposite direction to permit pressurized air and vapors displaced by the incoming fuel to escape. More specifically, both fuel hose fittings comprise a nipple forming body portion 84 which encloses bias spring 86, valve body 88 and rubber O-ring seal 90. The body portion 84 provides a valve seat against which valve body 84 and O-ring seal 90 seat.

Preferably, bias springs 86 provide sufficient force to prevent the weight of fuel within the tank from opening the vent hose fitting valve during a collision or roll-over situation. Thus, even if one or both of the hoses 54 and 58 have been punctured or disconnected, fuel will not escape from the tank. The pressure required to open the check valve within vent hose fitting 82 is generated by the incoming fuel pressure, which at normal flow rates will exceed the vent hose capability, thereby creating a positive trapped air pressure within the tank. This trapped air pressure builds up until the force of the bias spring is overcome, whereupon the air pressure is vented through vent hose 58.

Body portion 84 is preferably formed with an outwardly extending rebent portion 92 which serves to capture the body portion within the corresponding opening in the tank wall. Preferably this rebent portion is formed to capture an annular gasket 94 against the tank wall. The body portion and gasket are held in place by a force fitted retainer 96 which is preferably formed of metal and provides a spring force which bites into or grips the body portion 84. The retainer is formed with a flanged skirt 98 which maintains the assembled relationship of the body portion and gasket with the tank wall. The opposite end of retainer 96 is formed with an outwardly presenting annular or partially annular bead 100 which snap fits with the associated connector 72 or 73, to hold the connector tightly in place while permitting the connection to swivel.

Although the various components of the invention may be fabricated from a wide range of materials, the presently preferred embodiment utilizes fuel resistant plastic injection molded parts except as otherwise indicated. Suitable plastic materials include polyethylenes, polyesters, nylons, and so forth. Gaskets and seals may be fabricated of rubber or other elastomeric plastic materials such as polyurethane or the like. Nozzle end seal 70, for example, may be manufactured from rubber or polyurethane. Except as otherwise noted, fuel hose fitting 80 and vent hose fitting 82 are preferably fabricated of metal, although plastic materials might also be utilized. Connectors 72 and 73 are likewise preferably fabricated of metal, although plastic may be utilized, in which case it may be preferable to flare the ends of hoses 54 and 58 somewhat, so that they will fit over the nipple ends of the fittings 80 and 82.

In operation, the spring steel splash door 44 is held in a normally closed position, wherein the door 44 acts as a "backsplash" element to cause leaded fuel from a large diameter nozzle inserted into the chamber 34 to splash back and cause the nozzle to shut off. Likewise, both check valves within the fuel hose fitting and vent hose fitting are also held closed, which prevents the escape of fuel and fuel vapors, although permits the release of overpressures may develop in the gas tank.

When filling the tank, the gas pump nozzle is inserted through aperture 46, deflecting splash door 44, and thence through intermediate fuel passage 66 until the end of the nozzle stops against depth stops 60. The nozzle end seal 70 grips the end of the nozzle, so that fuel cannot splash back into the vent cut-off chamber and also so that pumping pressures are directed through the fuel hose and not into the vent cut-off chamber 36. Fuel may be pumped at comparatively high flow rates under pressure of the gas pump. The gas pump pressure overcomes the bias spring of the check valve within the fuel hose fitting, thus allowing fuel to flow into the gas tank. The incoming fuel displaces the air within the tank so that a positive trapped air pressure builds up within the tank. This causes the check valve within the vent hose fitting to open, whereupon the displaced air is vented into vent cut-off chamber 36 and out through aperture 48.

By providing an escape route for back pressures which is isolated from the gas pump nozzle by means of seal 70, the automatic cut-off mechanism within the gas pump nozzle will not be falsely triggered by the back pressures. This allows the gas pump to be pressure filled at the maximum flow rate of the gas pump. The invention thus eliminates the annoying pretriggering of the automatic cut-off mechanism and thereby allows the gas tank to be filled to its maximum capacity quickly and without having to repeatedly reset the cut-off mechanism by repeatedly squeezing the fuel dispensing handle.

In an alternative embodiment, useful in jurisdictions with stringent air pollution regulations, the vent hose 58 may be provided with a T-fitting as illustrated in phantom lines as fitting 102. T-fitting 102 may be coupled to a vapor collection cannister 104 which traps fuel vapors before venting to atmosphere so that fuel vapors expelled from the gas tank will be diverted into cannister 104 instead of being allowed to escape to the atmosphere. In such an embodiment, the second aperture 48 would be permanently blocked or omitted, and a suitable nozzle engaging seal similar to seal 70 would be provided around the aperture 46 or within the cap receiving portion 12, so that the majority of the vapors expelled from the gas tank will be routed to the vapor collection cannister due to the comparatively higher pressure within the vent cut-off chamber 36. Once the gas tank is completely full, however, raw fuel will flow out through the vent hose fitting thereby blocking the opening to the cannister 104. When this occurs, back pressures developed within the fuel hose will be sufficient to trigger the cut-off mechanism.

While certain representative embodiments and details have been shown for the purpose of illustrating the invention, it will be apparent to those skilled in the art that various changes and modifications may be made therein without departing from the spirit or scope of the invention as set forth in the following claims.

I claim:
1. A fuel filling system for dispensing fuel from a dispensing nozzle into the fuel tank of an automotive vehicle comprising:
   an inlet housing which defines vent chamber means;
   a fuel delivery pipe coupled between said inlet housing and said fuel tank;
   a vent pipe coupled between said inlet housing and said fuel tank and communicating with said vent chamber means;
   an intermediate passageway defined within said inlet housing and connecting said vent chamber means with said fuel delivery pipe, said intermediate passageway being arranged to receive said nozzle during the dispensing fuel; and
   sealing means disposed within said intermediate passageway and sized to frictionally embrace said dispensing nozzle and to thereby isolate said vent chamber means from said fuel delivery pipe during the dispensing of fuel.

2. The fuel filling system of claim 1 wherein said fuel delivery pipe and said vent pipe each comprise flexible hoses having electrically conductive inner walls.

3. The fuel filling system of claim 1 wherein said fuel delivery pipe and said vent pipe are each coupled to said fuel tank through check valves.

4. The fuel filling system of claim 3 wherein said check valves are biased normally closed and open in response to pumping pressures during the dispensing of fuel.

5. The fuel filling system of claim 1 wherein said fuel delivery pipe and said vent pipe are coupled to said fuel tank using snappingly engaging connectors.

6. The fuel filling system of claim 1 wherein said sealing means comprises an annular elastomeric seal.

7. The fuel filling system of claim 1 further comprising a vapor collection means communicating with said vent pipe for trapping fuel vapors and thereby preventing said vapors from escaping to the atmosphere and means for blocking the flow of vapor to the atmosphere.

8. The fuel filling system of claim 1 further comprising a venting aperture communicating with said vent chamber means for venting pressures within said vent chamber means to the atmosphere.

9. The fuel filling system of claim 1 further comprising first check valve means for coupling said fuel delivery pipe to said fuel tank and second check valve means for coupling said vent pipe to said fuel tank, both of said check valves being biased normally closed, said first check valve being operable to permit fluid under pressure to flow into said fuel tank and said second check valve being operable to permit fluid under pressure to flow out from said fuel tank.

10. A fuel filling system for dispensing fuel from a dispensing nozzle into the fuel tank of an automotive vehicle comprising:
an inlet housing for receiving said dispensing nozzle;
a fuel delivery pipe and a vent pipe both coupled to said inlet housing;
a first check valve means for coupling said fuel delivery pipe to said fuel tank, said first check valve being biased normally closed and operable in response to fluid pressures within said fuel delivery pipe to open and permit fluid flow into said tank;
a second check valve means for coupling said vent pipe to said fuel tank, said second check valve being biased normally closed and operable in response to fluid pressures within said fuel tank to open and permit fluid flow into said vent pipe.

11. The fuel filling system of claim 10 wherein said first check valve is disposed on said fuel tank.

12. The fuel filling system of claim 10 wherein said second check valve is disposed on said fuel tank.

13. The fuel filling system of claim 10 wherein said fuel delivery pipe and said vent pipe are provided with snap-locking connectors for coupling said pipes to said fuel tank.

14. The fuel filling system of claim 10 wherein said fuel delivery pipe and said vent pipe each comprise flexible hoses having electrically conductive inner walls.

15. The fuel filling system of claim 10 further comprising sealing means disposed within said inlet housing for sealingly embracing said nozzle and for substantially preventing said fluid pressure within said fuel delivery pipe from escaping directly into said inlet housing.

16. The fuel filling system of claim 10 wherein said check valve means each include biasing means for preventing said check valve means from opening under the weight of the fuel within said fuel tank.

* * * * *

UNITED STATES PATENT AND TRADEMARK OFFICE
CERTIFICATE OF CORRECTION

PATENT NO. : 4,610,284

DATED : September 9, 1986

INVENTOR(S) : Donald D. Bartholomew

It is certified that error appears in the above-identified patent and that said Letters Patent is hereby corrected as shown below:

Col. 3, Line 15,      "24." should be —24—

Col. 3, Line 63,      "to" has been omitted between "connection" and "the"

Col. 3, Line 67,      "house" should be "hose"

Col. 4, Line 44,      "must" should be —may—

Col. 4, Line 68,      "house" should be —hose—

Col. 8, Line 32, Claim 15,      "pressure" should be —pressures—

Signed and Sealed this

Eighth Day of March, 1988

*Attest:*

DONALD J. QUIGG

*Attesting Officer*      *Commissioner of Patents and Trademarks*